(12) United States Patent
Abrams (10) Patent No.: US 7,364,782 B2
(45) Date of Patent: Apr. 29, 2008

(54) FLOCKED TRANSFER AND ARTICLE OF MANUFACTURE INCLUDING THE APPLICATION OF THE TRANSFER BY THERMOPLASTIC POLYMER FILM

(75) Inventor: Louis Brown Abrams, County of Larimer, CO (US)

(73) Assignee: High Voltage Graphics, Inc., Fort Collins, CO (US)

( * ) Notice: Subject to any disclaimer, the term of this patent is extended or adjusted under 35 U.S.C. 154(b) by 59 days.

(21) Appl. No.: 09/735,721

(22) Filed: Dec. 13, 2000

(65) Prior Publication Data

US 2002/0009571 A1    Jan. 24, 2002

Related U.S. Application Data

(63) Continuation-in-part of application No. 09/621,830, filed on Jul. 24, 2000.

(51) Int. Cl.
*B32B 33/00*    (2006.01)
(52) U.S. Cl. .............................. 428/90; 428/86; 428/97; 428/914
(58) Field of Classification Search .................. 428/82, 428/904, 187, 35.7, 35.9, 36.1, 36.4, 36.5, 428/40.1, 40.5, 417, 41.8, 42.2, 42.3, 62, 428/85, 86, 88, 90, 91, 97, 95, 151, 542.2, 428/6, 914; 442/149, 150, 152
See application file for complete search history.

(56) References Cited

U.S. PATENT DOCUMENTS

| D66,035 S | 11/1924 | McIntosh ...................... D6/593 |
| 1,905,989 A | 4/1933 | Safir et al. ................... 428/189 |
| D108,581 S | 2/1938 | Robinson .................. D6/583 X |
| D114,814 S | 5/1939 | Hoos ........................... D6/593 |
| D122,192 S | 8/1940 | De Moreau .................. D6/593 |
| D125,860 S | 3/1941 | Haas ........................... D6/593 |
| D162,533 S | 3/1951 | Goldfarb ..................... D6/593 |
| 2,592,602 A | 4/1952 | Saks |

(Continued)

FOREIGN PATENT DOCUMENTS

AT      E 93 557      8/1988

(Continued)

OTHER PUBLICATIONS

U.S. Appl. No. 09/621,830, filed Jul. 24, 2000, Abrams.

(Continued)

*Primary Examiner*—Cheryl Juska
(74) *Attorney, Agent, or Firm*—Sheridan Ross P.C.

(57) ABSTRACT

A flocked transfer is produced by applying a release agent to a release sheet, and then applying the flocking to a release agent. Unlike the traditional method, a binder and thermoplastic hot melt film is applied to the back of the flock. The transfer, which is essentially release sheet, is then applied to a substrate, such as item of clothing, a rubber pad, etc., by positioning a sheet of thermoplastic hot melt film on the substrate; placing the transfer on the hot melt with the flock in contact with the hot melt film; and applying heat and pressure. The heat melts the thermoplastic hot melt film to bind the flock to the substrate and binds the flocking together. This method reduces the cost involved in producing flocked articles, especially for articles produced on a continuous basis.

50 Claims, 3 Drawing Sheets

U.S. PATENT DOCUMENTS

| | | |
|---|---|---|
| 2,636,837 A | 4/1953 | Summers |
| 2,916,403 A | 12/1959 | Calderwood |
| 2,999,763 A | 9/1961 | Sommer |
| D195,245 S | 5/1963 | Edesess .................. D6/583 |
| 3,215,584 A | 11/1965 | McConnell et al. |
| 3,314,845 A | 4/1967 | Perri |
| 3,377,232 A | 4/1968 | Mencock et al. |
| 3,459,579 A | 8/1969 | Newman |
| 3,496,054 A | 2/1970 | Baigas |
| 3,529,986 A | 9/1970 | Kappas et al. ................. 117/17 |
| 3,565,742 A | 2/1971 | Stephens et al. |
| 3,622,434 A | 11/1971 | Newman |
| 3,639,149 A | 2/1972 | Spalding |
| 3,644,267 A | 2/1972 | Jackson, Jr. et al. |
| 3,657,060 A | 4/1972 | Haigh .......................... 161/73 |
| 3,660,200 A | 5/1972 | Anderson et al. |
| 3,674,611 A | 7/1972 | Petry et al. |
| 3,772,132 A | 11/1973 | Dulin, Jr. |
| 3,775,205 A | 11/1973 | Hermann et al. ............. 156/72 |
| 3,793,050 A | 2/1974 | Mumpower, Jr. |
| 3,803,453 A | 4/1974 | Hull |
| 3,816,060 A | 6/1974 | Koskolos .................... 431/350 |
| 3,816,211 A | 6/1974 | Haigh ........................ 156/309 |
| 3,837,946 A | 9/1974 | Gribbin |
| 3,900,676 A | 8/1975 | Alderson |
| 3,903,331 A | 9/1975 | Klein |
| 3,936,554 A | 2/1976 | Squier |
| 3,956,552 A | 5/1976 | Geary |
| 3,961,116 A | 6/1976 | Klein |
| 3,969,559 A | 7/1976 | Boe |
| 3,979,538 A | 9/1976 | Gilman et al. |
| 3,989,869 A | 11/1976 | Neumaier et al. ........... 428/254 |
| 4,018,956 A | 4/1977 | Casey .......................... 428/86 |
| 4,025,678 A | 5/1977 | Frank |
| 4,031,281 A | 6/1977 | Keeling |
| 4,034,134 A | 7/1977 | Gregorian et al. ............. 428/86 |
| 4,035,532 A | 7/1977 | Gregorian et al. ............. 428/90 |
| 4,062,992 A | 12/1977 | Power et al. |
| 4,088,708 A | 5/1978 | Riew |
| 4,102,562 A | 7/1978 | Harper et al. ............... 350/105 |
| 4,120,713 A | 10/1978 | Jensen et al. ................. 156/72 |
| 4,142,929 A | 3/1979 | Otomine et al. |
| 4,160,851 A | 7/1979 | Lienert et al. .............. 427/379 |
| 4,201,810 A | 5/1980 | Higashiguchi |
| 4,218,501 A | 8/1980 | Kameya et al. |
| 4,269,885 A | 5/1981 | Mahn ........................ 428/216 |
| 4,273,817 A | 6/1981 | Matsuo et al. ................ 428/90 |
| 4,282,278 A | 8/1981 | Higashiguchi ............... 428/90 |
| 4,292,100 A | 9/1981 | Higashiguchi |
| 4,294,641 A | 10/1981 | Reed et al. |
| 4,308,296 A | 12/1981 | Chitouras |
| 4,314,813 A | 2/1982 | Masaki .......................... 8/468 |
| 4,314,955 A | 2/1982 | Boden et al. ................. 264/51 |
| 4,340,623 A | 7/1982 | Justus |
| 4,340,632 A | 7/1982 | Wells et al. |
| 4,352,924 A | 10/1982 | Wooten et al. |
| 4,369,157 A | 1/1983 | Conner ...................... 264/246 |
| 4,370,374 A | 1/1983 | Raabe et al. |
| 4,385,588 A | 5/1983 | Bennetot .................... 118/638 |
| 4,387,214 A | 6/1983 | Passmore et al. |
| 4,388,134 A | 6/1983 | Long et al. ................. 156/248 |
| 4,390,387 A | 6/1983 | Mahn |
| 4,396,662 A | 8/1983 | Higashiguchi |
| 4,405,401 A | 9/1983 | Stahl ......................... 156/248 |
| 4,418,106 A | 11/1983 | Landler et al. |
| 4,423,106 A | 12/1983 | Mahn ........................ 428/207 |
| 4,430,372 A | 2/1984 | Knoke et al. |
| 4,438,533 A | 3/1984 | Hefele |
| 4,446,274 A | 5/1984 | Okazaki et al. |
| 4,465,723 A | 8/1984 | Knoke et al. |
| 4,510,274 A | 4/1985 | Okazaki et al. |
| 4,539,166 A | 9/1985 | Richartz et al. ............ 264/45.1 |
| 4,574,018 A | 3/1986 | Masuda et al. ................ 156/72 |
| 4,582,658 A | 4/1986 | Reichmann et al. ........ 264/45.1 |
| 4,610,904 A | 9/1986 | Mahn, Sr. et al. |
| 4,650,533 A | 3/1987 | Parker et al. |
| 4,652,478 A | 3/1987 | Maii ............................ 428/43 |
| 4,668,323 A | 5/1987 | Lenards et al. .............. 156/242 |
| 4,670,089 A | 6/1987 | Hanson |
| 4,681,791 A | 7/1987 | Shibahashi et al. ........... 428/96 |
| 4,687,527 A | 8/1987 | Higashiguchi ................ 156/72 |
| 4,741,791 A | 5/1988 | Howard et al. |
| 4,790,306 A | 12/1988 | Braun et al. ............ 128/206.12 |
| 4,793,884 A | 12/1988 | Horikiri ...................... 156/247 |
| 4,797,320 A | 1/1989 | Kopp et al. ............... 428/316.6 |
| 4,810,321 A | 3/1989 | Wank et al. ............ 156/244.23 |
| 4,810,549 A | 3/1989 | Abrams et al. |
| 4,812,247 A | 3/1989 | Fahner et al. ................ 252/511 |
| 4,834,502 A | 5/1989 | Bristol et al. ........... D14/114 X |
| 4,980,216 A | 12/1990 | Rompp ........................ 428/90 |
| 5,008,130 A | 4/1991 | Lenards ..................... 427/206 |
| 5,009,950 A | 4/1991 | Wagner et al. .............. 428/290 |
| 5,026,591 A | 6/1991 | Henn et al. ................. 428/198 |
| 5,026,891 A | 6/1991 | Henn et al. ................. 428/198 |
| 5,041,104 A | 8/1991 | Seal |
| 5,043,375 A | 8/1991 | Henning et al. ............. 524/372 |
| 5,047,103 A | 9/1991 | Abrams et al. |
| 5,053,179 A | 10/1991 | Masui et al. ................. 264/257 |
| 5,077,116 A | 12/1991 | Lefkowitz |
| 5,108,530 A | 4/1992 | Niebling, Jr. et al. ........ 156/245 |
| 5,112,423 A | 5/1992 | Liebe, Jr. |
| 5,115,104 A | 5/1992 | Bunyan |
| 5,154,871 A | 10/1992 | Wagner et al. .............. 264/255 |
| 5,198,277 A | 3/1993 | Hamilton et al. ............. 428/92 |
| 5,207,851 A | 5/1993 | Abrams |
| 5,217,563 A | 6/1993 | Niebling et al. ............. 156/382 |
| 5,217,781 A | 6/1993 | Kuipers ........................ 428/85 |
| 5,248,536 A | 9/1993 | Du Katz ...................... 428/40 |
| 5,274,039 A | 12/1993 | Sirinyan et al. ............. 525/130 |
| 5,306,567 A | 4/1994 | Kuo et al. |
| 5,338,603 A | 8/1994 | Mahn et al. |
| 5,346,746 A | 9/1994 | Abrams |
| 5,350,474 A | 9/1994 | Yamane ...................... 156/240 |
| 5,350,830 A | 9/1994 | Kuo et al. |
| 5,358,789 A | 10/1994 | Kuo et al. |
| 5,383,996 A | 1/1995 | Dressler |
| D365,342 S | 12/1995 | Evenson et al. ............ D14/114 |
| D366,654 S | 1/1996 | Lovegrove et al. ........ D14/114 |
| 5,489,359 A | 2/1996 | Yamane ...................... 156/540 |
| 5,529,650 A | 6/1996 | Bowers et al. |
| 5,534,099 A | 7/1996 | Yamamoto .................. 156/230 |
| 5,564,249 A | 10/1996 | Borys et al. |
| 5,597,637 A | 1/1997 | Abrams et al. |
| 5,622,587 A | 4/1997 | Barthelman .................. 156/251 |
| 5,693,400 A | 12/1997 | Hamilton et al. ............. 428/89 |
| D391,572 S | 3/1998 | Lee |
| 5,762,379 A | 6/1998 | Salmon et al. ................. 283/91 |
| 5,766,397 A | 6/1998 | Jones ........................ 156/230 |
| 5,804,007 A | 9/1998 | Asano ......................... 156/72 |
| 5,858,156 A | 1/1999 | Abrams et al. |
| 5,900,096 A | 5/1999 | Zemel ........................ 156/233 |
| 5,912,065 A | 6/1999 | Kukoff ........................ 428/195 |
| 5,922,436 A | 7/1999 | Banfield et al. ............. 428/100 |
| 5,981,009 A | 11/1999 | Iacono et al. ............... 428/40.1 |
| 6,010,764 A * | 1/2000 | Abrams ........................ 428/90 |
| 6,083,332 A | 7/2000 | Abrams |
| 6,102,686 A | 8/2000 | Eschenfelder ............... 425/388 |
| 6,110,560 A | 8/2000 | Abrams ........................ 428/90 |
| 6,113,149 A | 9/2000 | Dukatz ......................... 283/91 |
| 6,146,485 A | 11/2000 | Iacono et al. ............... 156/230 |
| 6,170,881 B1 | 1/2001 | Salmon et al. ................. 283/91 |
| 6,171,678 B1 | 1/2001 | Holeschovsky et al. ....... 428/97 |
| 6,202,549 B1 | 3/2001 | Mitsam et al. ................. 101/27 |
| 6,224,707 B1 | 5/2001 | Lion .......................... 156/230 |

| | | | | | | |
|---|---|---|---|---|---|---|
| 6,249,297 B1 | 6/2001 | Lion ........................ 347/171 | | JP | 5862027 | 4/1983 |
| 6,257,866 B1 | 7/2001 | Fritz et al. ............... 425/387.1 | | JP | 59115885 | 7/1984 |
| 6,264,775 B1 | 7/2001 | Holeschovsky et al. ...... 156/72 | | JP | 63118544 | 5/1988 |
| 6,277,312 B1 | 8/2001 | Hansen et al. ............. 264/132 | | JP | 64-61299 | 3/1989 |
| 6,296,908 B1 | 10/2001 | Reihs et al. ............ 427/393.5 | | JP | 5-201196 | 8/1993 |
| 6,299,715 B1 | 10/2001 | Langsdorf et al. ........... 156/72 | | JP | 05255021 | 10/1993 |
| 6,387,472 B1 | 5/2002 | Reck et al. ................ 428/195 | | JP | 10059790 | 3/1998 |
| 6,428,877 B1 | 8/2002 | Suss et al. ................. 428/195 | | JP | 11277662 | 10/1999 |
| 6,436,506 B1 | 8/2002 | Pinter et al. | | JP | 11348159 | 12/1999 |
| 6,451,148 B1 | 9/2002 | Jenner ...................... 156/230 | | JP | 2001270019 | 10/2001 |
| 6,569,538 B1 | 5/2003 | Kaschel | | KR | 220373 | 9/1999 |
| 6,660,352 B2 | 12/2003 | Hsu et al. | | KR | 2003063833 | 7/2003 |
| 6,676,796 B2 | 1/2004 | Pinter et al. | | NO | 306099 | 6/1989 |
| 6,887,737 B1 | 5/2005 | Woods et al. | | TW | 62640 | 7/1993 |
| 2001/0008672 A1 | 7/2001 | Norvell et al. | | WO | WO 79/01146 | 12/1979 |
| 2002/0098329 A1 | 7/2002 | Abrams | | WO | WO 89/01829 | 3/1989 |
| 2003/0129353 A1 | 7/2003 | Abrams | | WO | WO 90/09289 | 8/1990 |
| 2004/0170799 A1 | 9/2004 | Carr et al. | | WO | WO 94/19530 | 9/1994 |
| 2005/0081985 A1 | 4/2005 | Abrams | | WO | PCT/US01/23195 | 1/2002 |
| 2005/0158508 A1 | 7/2005 | Abrams | | WO | WO 02/07959 | 1/2002 |
| 2005/0266204 A1 | 12/2005 | Abrams | | WO | WO 02/09925 | 2/2002 |
| 2005/0268407 A1 | 12/2005 | Abrams | | WO | WO 02/058854 | 8/2002 |
| 2006/0026778 A1 | 2/2006 | Lion | | WO | WO 03/031083 | 4/2003 |
| 2006/0029767 A1 | 2/2006 | Lion | | WO | WO 2004/005023 | 1/2004 |
| 2006/0251852 A1 | 11/2006 | Abrams | | WO | WO 2004/005413 | 1/2004 |
| 2007/0003761 A1 | 1/2007 | Miyazono et al. | | WO | WO 2004/005600 | 1/2004 |
| 2007/0022548 A1 | 2/2007 | Abrams | | WO | WO 2005/035235 | 4/2005 |
| 2007/0026189 A1 | 2/2007 | Abrams | | WO | WO 05/118948 | 12/2005 |
| | | | | ZA | 88/6259 | 4/1990 |

FOREIGN PATENT DOCUMENTS

| | | |
|---|---|---|
| AT | E 135 427 | 8/1996 |
| AU | 606651 | 2/1991 |
| AU | 653994 | 10/1994 |
| BE | 0506601 | 3/1996 |
| CA | 757595 | 4/1967 |
| CA | 2010076 | 8/1990 |
| CA | 1306411 | 8/1992 |
| CA | 2064300 | 9/1992 |
| DE | 3883517 | 5/1994 |
| DE | 69208910 | 8/1996 |
| DE | 19734316 | 2/1999 |
| EP | 0122656 | 10/1984 |
| EP | 0 210304 | 2/1987 |
| EP | 0 280 296 | 2/1988 |
| EP | 0 351 079 | 6/1989 |
| EP | 0506601 A1 | 9/1992 |
| EP | 0506601 | 5/1996 |
| EP | 0 685 014 | 5/1997 |
| EP | 0913271 A1 | 10/1998 |
| EP | 989227 | 3/2000 |
| ET | 24637BE/96 | 6/1996 |
| FR | 2543984 | 10/1984 |
| FR | 2659094 | 3/1990 |
| FR | 9002623 | 3/1990 |
| FR | 2659094 | 9/1991 |
| FR | 2784619 | 4/2000 |
| FR | 2846202 | 4/2004 |
| GB | 1171296 | 11/1969 |
| GB | 1 447 049 | 8/1976 |
| GB | 1 466 271 | 3/1977 |
| GB | 2065031 | 12/1979 |
| GB | 2126951 | 9/1983 |
| GB | 2214869 | 9/1989 |
| GB | 0506601 | 9/1992 |
| IE | 55104 | 4/1984 |
| IT | 0329767 | 8/1993 |
| JP | 56108565 | 1/1980 |
| JP | 55079143 | 6/1980 |
| JP | 55-147171 | 11/1980 |
| JP | 56058824 | 5/1981 |
| JP | 56107080 | 8/1981 |
| JP | 56141877 A2 | 11/1981 |

ZA 92/2154 2/1993

OTHER PUBLICATIONS

Stahls', New Product Bulletin.
Agion Technologies, LLC., *The Most Advanced Antimicrobial Silver Delivery System*.
Bayer Plastics Divison Press Release, *Wheel Covers, Center Caps Become Revolving Art Forms with New Film Insert Molding Technology*, Jun. 19, 2000.
Shaner, *Advanced Molding Processes: Low Pressure Molding/Low-High Pressure Molding for Interior Trim*, Ken 1997.
Synder *Fabric Molding Shows Promise in Automotive*, Oct. 1999.
Defosse, *Systems Approach Gives Blow Molders Big Edge*, Dec. 2000.
U.S. Appl. No. 29/058,551, filed Aug. 19, 1996, Abrams.
U.S. Appl. No. 09/548,839, filed Apr. 13, 2000, Abrams.
Declaration of L. Brown Abrams under 37 CFR §1, 132.
"A Rug Fit for a Mouse," *Time Magazine* (Sep. 28, 1998) p. 96.
"Rugs for Rodents," *Newsweek* (Nov. 9, 1998), p. 8.
"New pads for computer mice now cutting a different rug," *USA Today* (Oct. 26, 1998), p. D1.
"Magic Carpet," *Wired* (Nov. 1998), p. 68.
"When is a mouse pad really a rug?" *The Denver Business Journal*. (Nov. 1998), at http://denver.bizjournals.com/denver/stories/1998/11/30/story3.html.
Sears Catalog, Spring/Summer, bath carpets, (B), fringed oblong, pp. 1290-1291, oriental design rugs, A-B, p. 1146, copy in 2000 design library (1978).
JC Penney Catalog, Fall & Winter, accent rugs, A-B, p. 1032, copy in 2000 design library (1991).
Office Action Summary dated Apr. 28, 2005 for U.S. Appl. No. 10/455,575, 14 pages.
First Office Action (with translation) dated Apr. 1, 2005 for Chinese Patent Application No. 01821885.7, 8 pages.
Lextra® MouseRug®; "About the Product" (Jan. 27, 1999), http://www.mouserug.com/mouserug/aboutmouserugs.html, 2 pages.
Lextra® MouseRug®; "MouseRug Components" (Jan. 27, 1999), http://www.mouserug.com/mouserug/mousecomp.html, 1 page.
Lextra® MouseRug®; "Dimensions" (Jan. 27, 1999), http://www.mouserug.com/mouserug/dimensions.html, 1 page.
Bostik USA; "Industrial Adhesives" (2001), 3 pages.
Brown Abrams, "Flocking A Touch of Velour" *ScreenPrinting* (Apr. 1987).

Brown Abrams, "Part II: Flocking" *ScreenPrinting* (Jun. 1987).
U.S. Appl. No. 10/455,541, filed Jun. 4, 2003, Abrams.
U.S. Appl. No. 10/670,091, filed Sep. 23, 2003, Abrams.
U.S. Appl. No. 10/455,575, filed Jun. 4, 2003, Abrams.
U.S. Appl. No. 09/629,746, filed Jul. 31, 2000, Abrams.
U.S. Appl. No. 10/394,357, filed Mar. 21, 2003, Abrams.
U.S. Appl. No. 10/265,206, filed Oct. 4, 2002, Abrams.
U.S. Appl. No. 10/613,981, filed Jul. 3, 2003, Abrams.
U.S. Appl. No. 10/614,340, filed Jul. 3, 2003, Abrams.
U.S. Appl. No. 10/613,982, filed Jul. 3, 2003, Abrams.
U.S. Appl. No. 10/614,399, filed Jul. 3, 2003, Abrams.
Declaration of L. Brown Abrams Under 37 CFR § 1.98 for U.S. Appl. No. 09/735,721 dated Jan. 16, 2004, 2 pages.
Office Action Summary dated Apr. 22, 2005 for U.S. Appl. No. 10/455,541.
Office Action Summary dated Oct. 11, 2005 for U.S. Appl. No. 10/670,091, filed Sep. 23, 2003.
Jun. 16, 2006 Office Action In Re Application Of Louis Brown Abrams; U.S. Appl. No. 10/670,091; filed Sep. 23, 2003.
European Search Report, issued Jan. 12, 2006, in European Patent Application No. 01998050.7.
Dec. 30, 2005 Supplemental First Office Action, Chinese Application No. 01814634.1 (English translation provided only).
Apr. 5, 2006 Office Action In Re Application Of Louis Brown Abrams; U.S. Appl. No. 10/455,541; filed Jun. 4, 2003.
Oct. 27, 2005 Office Action In Re Application Of Louis Brown Abrams; U.S. Appl. No. 10/455,541; filed Jun. 4, 2003.
Mar. 23, 2006 Office Action In Re Application Of Louis Brown Abrams; U.S. Application No. 10/455,575; filed Jun. 4, 2003.
Oct. 28, 2005 Office Action In Re Application Of Louis Brown Abrams; U.S. Appl. No. 10/455,575; filed Jun. 4, 2003.
Oct. 8, 2002 Office Action In Re Application Of Louis Brown Abrams; U.S. Appl. No. 09/621,830; filed Jul. 24, 2000.
Oct. 7, 2005 Office Action In Re Application Of Louis Brown Abrams; U.S. Appl. No. 09/621,830; filed Jul. 24, 2000.
European Search Report, issued Jul. 17, 2006, in European Patent Application No. 01998050.7.
Jan. 11, 2007 Office Action in Re Application of Louis Brown Abrams; U.S. Appl. No. 10/455,541; filed Jun. 4, 2003.
Jan. 10, 2007 Office Action in Re Application of Louis Brown Abrams; U.S. Appl. No. 10/455,575; filed Jun. 4, 2003.
U.S. Appl. No. 11/460,493, Abrams.
U.S. Appl. No. 11/533,699, Abrams.
U.S. Appl. No. 11/560,679, Abrams.
U.S. Appl. No. 11/565,974, Abrams.
"RMIUG Meeting Minutes—Colorado in the Information Age", Jan. 14, 1997; 1 page.
Artisyn Synthetic Paper 165, Printability Product Specification Sheet, Mar. 1999, 2 pages.
Artisyn Synthetic Paper 165, Printability Product Specification Sheet, May 1997, 1 page.
Bostik USA; Web & Powder Adhesives; 2000; 2 pgs.
Cellusuede Products, Inc, "About Flock", Available at http://www.cellusuede.com/navabout.html, KMK Media Group, copyright 2000, 1 pages.
Cellusuede Products, Inc, "FAQ's", Available at http://www.cellusuede.com/faq.html, KMK Media Group, copyright 2000, 2 pages.
Cellusuede Products, Inc. "Fiber Types", Available at http://www.cellusuede.com/about/types.html, KMK Media Group, copyright 2000, 4 pages.
Cellusuede Products, Inc, "Glossary of Terms", Available at http://www.cellusuede.com/glossary/index.html, KMK Media Group, copyright 2000, 2 pages.
Cellusuede Products, Inc, "Uses for Flock, Home Furnishings", Available at http://www.cellusuede.com/home.html, KMK Media Group, copyright 2000, 2 pages.
Changpad Trading Inc.; Heat-Trans Pad; Jan. 27, 1999, available at http://www.changpad.com.tw/heat-trans.htm, 1 page.
Computer Current (Nov. 9, 1998).
Fake Fur Computer Accessories; Products; Jan. 27, 1999, available at http://workwares.com.au/products.htm, 3 pages.
Sonics & Materials, Inc., "Chart II Compatability of Thermoplastics" (undated), 1 page.
Takatori, Hiroyuki, "Dieprest In-mold Laminate Technology," Automotive & Transportation Interiors Expo Conference 1999, Session 12, pp. 1-4.
Declaration of L. Brown Abrams Under 37 CFR § 1.98 for 09/735,721 dated Jan. 16, 2004, 2 pages.
Declaration of L. Brown Abrams under 37 CFR § 1.98 for U.S. Appl. No. 09/621,830 dated Jan. 7, 2003, 2 pages.
Examinier's First Report on Australian Patent Application No. 2001280771, mailed Jun. 3, 2005.
Examiners's First Report on Australian Patent Application No. 2002249810, mailed Oct. 20, 2005.
Examiner's Report No. 2 on Australian Patent Application No. 2001280771, mailed Jun. 2, 2006.
International Preliminary Examination Report for International Application No. PCT/US01/23195, mailed Jun. 20, 2002.
International Search Report for International Application No. PCT/US01/23195, mailed Oct. 30, 2001.
International Search Report for International Application No. PCT/US01/48615, mailed Jun. 17, 2002.
Office Action, Chinese Application No. 01814634.1 from Dec. 30, 2005 (English translation provided).
Official Action for U.S. Appl. No. 09/621,830, mailed Jun. 29, 2006.
Official Action for U.S. Appl. No. 09/621,830, mailed Nov. 15, 2006.
Office Action for U.S. Appl. No. 09/735,721, mailed Nov. 15, 2006.
Official Action for U.S. Appl. No. 10/670,091, mailed Feb. 20, 2007.
Official Action for U.S. Appl. No. 10/670,091, mailed Nov. 2, 2006.
Examiner's Report for Canadian Patent Application No. 2,415,680, mailed Apr. 17, 2007.
Invitation pursuant to Article 96(2) and Rule 51(2) EPC, dated Jun. 26, 2007, in European Patent Application No. 01998050.7.
Rejection Decision for Chinese Application No. 01814634.1 issued Apr. 6, 2007.
Official Action for U.S. Appl. No. 10/670,091, mailed Oct. 15, 2007.
"Bicomponent Fibers", available at http://web.utk.edu/~mse/pages/Textiles/Bicomponent%20fibers.htm, Updated Apr. 2004, 8 pages.
Official Action for U.S. Appl. No. 09/621,830, mailed May 16, 2007 (4811-9).
Official Action for U.S. Appl. No. 10/455,541, mailed Jun. 25, 2007 (4811-9-DIV).
Official Action for U.S. Appl. No. 10/455,575, mailed Jun. 20, 2007 (4811-9-CIP-DIV).

* cited by examiner

FLOCKED TRANSFER AND ARTICLE OF MANUFACTURE INCLUDING THE APPLICATION OF THE TRANSFER BY THERMOPLASTIC POLYMER FILM

CROSS-REFERENCE TO RELATED APPLICATION

This application is a continuation-in-part patent application based upon the prior application dated Jul. 24, 2000, having Ser. No. 09/621,830, owned by a common assignee.

STATEMENT REGARDING FEDERALLY SPONSORED RESEARCH DEVELOPMENT

N/A

BACKGROUND OF THE INVENTION

This invention relates to flocked transfers, and, in particular to an improved method incorporating thermoplastic polymer film, in the making of the flocked transfer, which can reduce the cost and time required of producing transfers by a significant amount.

Heretofore, flocked transfers have generally been produced by applying a release agent to a release sheet. The flocking is applied to the release sheet in the desired pattern. A binder and a permanent hot melt adhesive are applied to the back of the flocking, and the transfer is allowed to dry. The binder is required to hold the flocking in the desired pattern. The hot melt adhesive, which is applied to the transfer as a powder, is used to adhere the transfer to a substrate, such as an article of clothing, a rubber pad, etc. The transfer is applied to the substrate by placing the transfer on the substrate with the dried hot melt adhesive in contact with the substrate. Heat, such as from an iron, is then applied to the release sheet. The heat melts the hot melt adhesive, to cause hot melt adhesive to flow into intimate contact with the substrate, forming a mechanical or physical adhesion with the substrate. The release agent then allows the release sheet to be removed from the transfer, leaving the flocking exposed on the substrate.

This traditional method has worked well for years. However, the method can be improved upon to reduce the cost of producing the transfer, and hence, the cost of the item containing the transfer.

In my co-pending application, I have described the usage of a thermoset film in lieu of the bond and powder for adhesion, which film, when subject to heat, adheres to the substrate, functions as an inherence for the flock. This current invention adds further enhancements to this process, by allowing the application and usage of a thermoplastic film, for adherence of the flock transfer.

BRIEF SUMMARY OF THE INVENTION

In accordance with the invention, generally stated, a flocked transfer of the present invention is produced by applying a release agent to a release sheet, and then applying the flocking to the release agent. Unlike the traditional method, a binder and adhesive are not applied to the ends of the flock, but rather, a thermoplastic polymer film is used in lieu thereof.

To form an article of manufacture with the flocked transfer, a hot melt film (in the form of a sheet are cut to shape) is positioned on the substrate to which the transfer is to be applied. The hot melt is preferably a blank or blank film, but can be any thermoplastic type of polymer film. The flock with the release adhesive and release sheet (i.e., the transfer) is then placed on the sheet of hot melt film with the release sheet up, so that the flocking is in contact with the hot melt film. Heat is then applied to the transfer. The heat melts the hot melt film, and secures the flock to the substrate. Because the film is thermoplastic, even if it is subsequently subjected to heat, below a particular temperature, it will not remelt, nor become tacky, and hence, there is no risk of the fibers becoming matted down in any of this type of adhesive, which could otherwise ruin the plush pile effect. It is known that there is a enhanced adhesion with thermoplastic materials, because the thermoplastic materials will cross-attach, and thereby adhere the flock fibers to it, which may become chemically attached thereto. Through the usage of this invention, the finished flock surface is more plush, soft, because more of the fiber is exposed and extends upwardly out of the adhesive, than with the screen-printed latex, as currently used. Also, this affords better soil release during washing or cleaning because of less fiber/adhesive entanglement occurs with the flock, during application.

The use of a thermoplastic type of film for achieving adherence of a transfer to a surface, can be done either before or after the heat transferring operation, or where the heat transfer is produced. The thermoplastic film can be brought into the process at either stage, with respect to the manufacture of the transfer. It is most practical to combine the hot melt film before the heat transfer is fabricated, so it is combined in a convenient and portable manner, which operation was not possible with the previous type of application, for the thermoset film, because once the thermoset film was heated, it sets, and cannot be reheated.

In addition, it is possible to use a two-part thermoplastic type of film, such as commonly available in the industry, having different properties on each side in terms of, for example, melting point, and viscosity of structure. In this way, one can use a higher melting point hot melt film, of thermoplastic material, on the side that attaches to the flock fibers, so that the transfer is initially put together with higher heat in order to set the fibers in place, and then subsequently during application of the transfer to a textile, it may be done at a lower temperature to activate the hot melt on the substrate side while not hot enough to remelt the film holding the flock in place. Also, the hot melt holding the flock can be a very high viscosity, that is, it will not flow much when melted, in order to keep the fibers in place and not mat them together, while the film on the substrate side could be a lower viscosity type of film, that will readily flow so it will penetrate and establish a good mechanical adhesion of the transfer or grid to any substrate upon which the transfer is applied.

Thus, it is an object of this invention to provide for the development of a flock, that may be temporarily adhered onto a release film carrier, fabricated of a thermoplastic film. And, it is a further object that the hot melt film may be used as an intermediate layer, to attach the fibers to the substrate, when developing the transfer initially.

BRIEF DESCRIPTION OF THE SEVERAL VIEWS OF THE DRAWINGS

Corresponding reference numerals will used throughout the several views of the drawings.

DESCRIPTION OF THE PREFERRED EMBODIMENTS

The following detailed description illustrates the invention by way of example, and not by way of limitation. This description will enable one skilled in the art to make and use the invention, including what is presently believed is the best mode of carrying out the invention.

Figure 1:
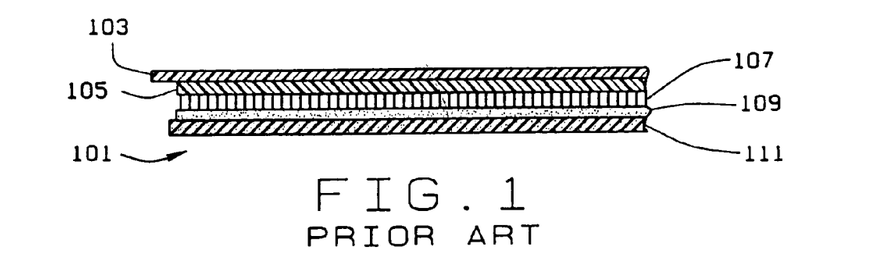
FIG. 1 is a cross-sectional view of a prior art flock transfer.

A prior art flock transfer 101 is shown in FIG. 1. As is known, such transfers include a dimensionally stable release sheet 103, to which a conventional flock transfer release adhesive 105 is applied in a pattern which corresponds to the overall image to be flocked. The flock 107 is then electrostatically coated to the release sheet 105. A binder adhesive 109 is applied to the exposed ends of the flock to bind the flock together as a unit. Lastly, a hot melt adhesive 111 is applied. The transfer is then allowed to dry. The transfer is applied to a substrate, as is known, by positioning the transfer on a substrate, such as a shirt, coat, or other item of clothing, with the hot melt adhesive in contact with the substrate, and applying to the transfer. The heat activates the hot melt adhesive to adhere the transfer to the substrate. This process is described in my prior patent, U.S. Pat. No. 4,810,549, as well as in my co-pending application, Ser. No. 09/548,839, filed Apr. 13, 2000, both of which are incorporated herein by reference.

In addition, I have described a similar transfer to that of this current invention, utilizing a thermosetting film, in my application having Ser. No. 09/621,830, filed on Jul. 24, 2000. The contents of that application are incorporated herein by reference.

Figure 2:
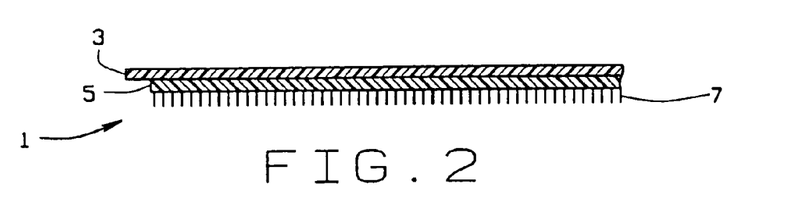
FIG. 2 is a cross-sectional view of a flock transfer of the present invention.

A flocked transfer 1 of the present invention is shown in FIG. 2. The transfer 1 of the present invention includes a release sheet 3, to which a conventional release agent 5, such as a wax, or other binder, has been applied. The release agent is applied to the sheet in the shape of a pattern of the flocking. Flocking 7 is then applied to the release agent, and hence, to the release sheet, to form the transfer. The flocking 7 is applied, for example, in the manner as described in my previous patent and applications, which are incorporated herein by reference. Unlike the prior art processes, the transfer 1 is made without the use of a binder adhesive or hot melt adhesive. As is discussed below, a thermoplastic film is used to adhere the transfer to a substrate.

An article of manufacture, such as an item of clothing having a transfer 1 applied thereto, a mouse pad, coaster, or any numerous items having a flocked surface, can be manufactured in accordance with this invention and is easily produced using the transfer 1. Referring to FIGS. 2-5, the article of manufacture 11 is produced by positioning a hot melt sheet 13 between a substrate 15 and the flocked release sheet. The hot melt sheet is, for example, a sheet of thermosetting polyester, available from Bostik, Inc. The hot melt sheet can also be made from a thermoplastic polymer, comprising polyesters, and which is available from Bostik. The hot melt sheet can also be made from a thermoplastic polyurethane. Any other thermoplastic film should also work well. The substrate 15 can be an item of clothing, a rubber pad (as for example, for producing a mouse pad or coaster), etc. The hot melt sheet can be precut to correspond to the shape of the transfer. The transfer 1 is then positioned on the hot melt sheet with the flock 7 against the hot melt sheet 13. Heat is applied to the transfer through the release sheet to activate the hot melt sheet. The hot melt sheet then acts to both bind the flock 7 together and to generally permanently adhere the flock 7 to the substrate 15. Preferably, to assemble the article, the flocked release sheet, the thermoplastic film, and the substrate are brought together and passed through a heat-laminating press where the three parts are subject to temperature of about 300° F. to about 350° F. (about 150° C.) and pressure (about 40-50 psi) for about 30 seconds. It has been found that medium-to-firm pressure has been most advantageous in providing for assembly of this type of plush flocked transfer. The pressure and heat will cause the hot melt film to adhere to the flock and the substrate. Additionally, the hot melt film will physically adhere or cure, to give a strong attachment of the flock to the substrate.

The basic premise of this application in utilizing a thermoplastic film which will semi-cure, after heat has been used to apply the transfer to a substrate, is that after heat application, if the temperature of the transfer does not rise to a particular heat level, it should not remelt again. In other words, the object is to use a hot melt film which has a melting point significantly high enough, so that when the transfer is applied through heat, it will adhere to the substrate, but that when the transfer and the substrate to which it is applied is not exposed to excessive heat, it will not remelt, even through the polymer film is thermoplastic, and for all practical purposes, in actual usage, the film will not remelt since it does not see those high temperatures again. In other words, if the melting point of the thermoplastic film is 350° F., and the top temperature that the flocked finished product will encounter, for example sunlight in a hot car, is only 250° F., then there is not a problem associated with the fact that the film is a thermoplastic and therefore can theoretically melt again, but only if it encounters those excessive temperatures.

Another attribute of the use of a thermoplastic film is that in the event one desires to remove the flocked transfer from, for example, an item of clothing, subjecting the transfer to those elevated temperatures, again, will allow the flock to be removed, if that is a need of the owner.

Figure 3:
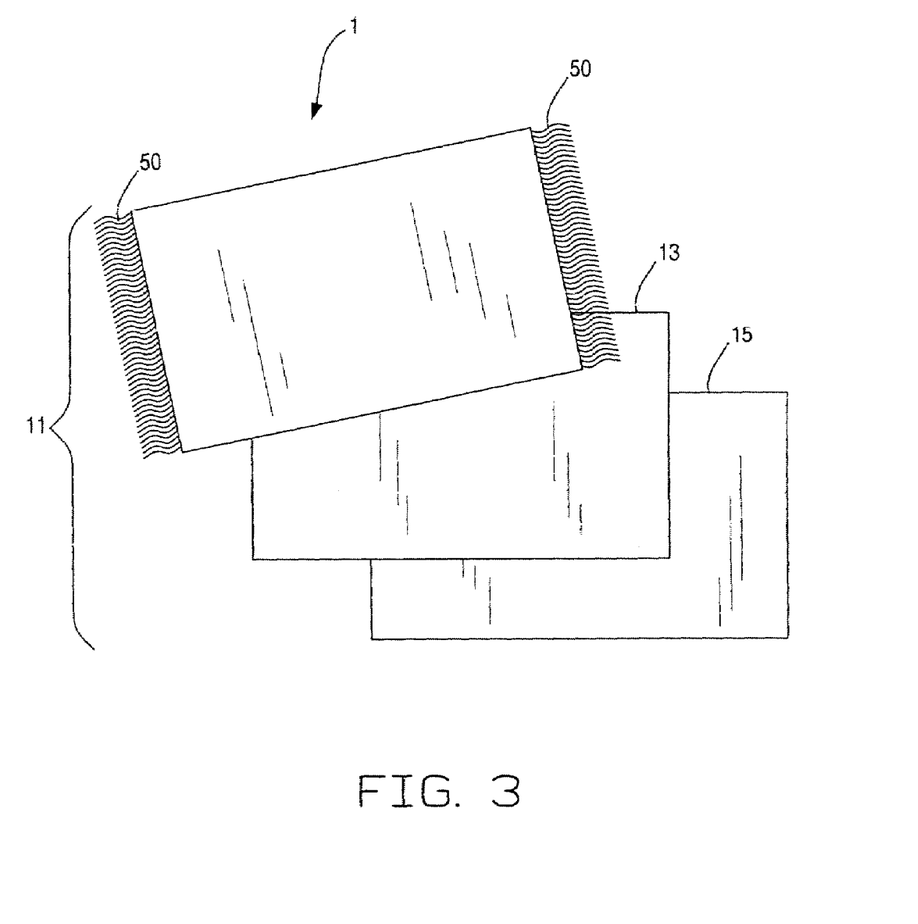
FIG. 3 is an exploded view of the transfer, a hot melt sheet, and a substrate used to make an article of manufacture.
Figure 4:
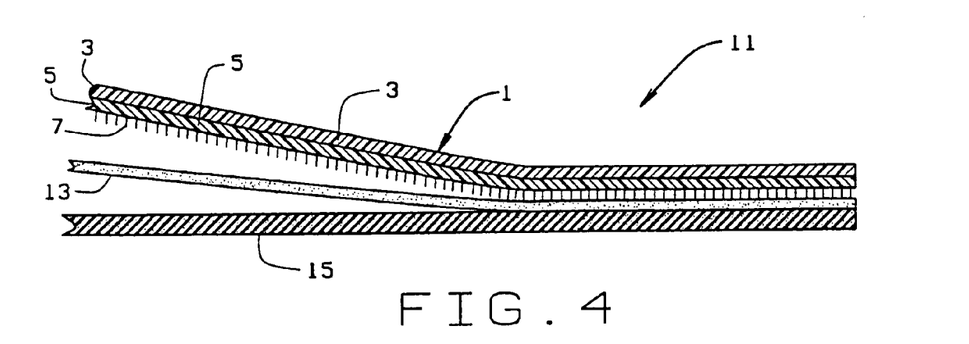
FIG. 4 is a cross-sectional view of an article of manufacture using the transfer of the present invention, showing a part of the transfer applied to part of the substrate and a part of the transfer and hot melt film spaced from the substrate.
Figure 5:
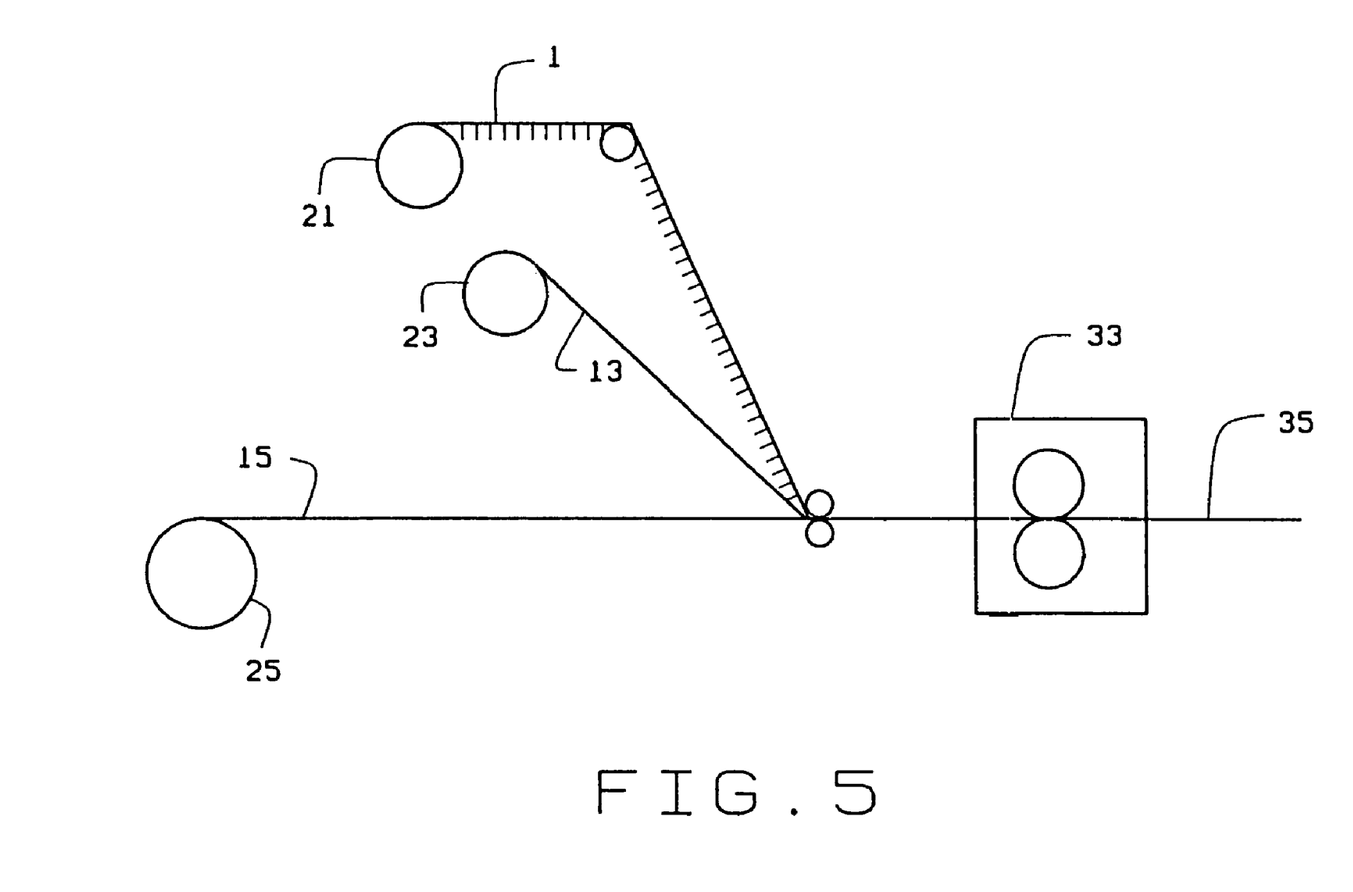
FIG. 5 is a schematic drawing of a process for continuously producing articles of manufacture, such as mouse pads, coasters, transfers for application to clothing, etc.

Articles, such as mouse pads or coasters, in which the entire top surface of the article is covered with the flocking can be produced on a continuous basis, as shown in FIGS. 3 and 5. Rolls 21, 23, and 25 of a flocked release sheet 1, the thermoplastic hot melt film 13, and the substrate 15, are provided. The three parts are brought together at a lamination station 33. Rollers can be provided in front of the station 33 so that the three elements are adjacent each other as they enter the lamination station. Rollers can be provided in front of the station 33 so that the three elements are adjacent as they enter the lamination station. In the lamination station, heat and pressure are applied to the three sheets (the flocked release sheet, the hot melt film, and the substrate) to melt the hot melt film. The melted hot melt film will then cure or cross-link, as noted above, to adhere the flock to the substrate. A web 35 exits the laminating station. The web 35 is then allowed to cool. The web 35 is ultimately directed to a cutting station where it is cut into individual articles. Once the web 35 is cooled, it can be directed immediately to a cutting station (after the sheet 35 cools), or can it can be wound up on an uptake roller to be cut into individual articles at a later time, or at a different location. At the cutting station, the release sheet 3 is removed from the flock and gathered on a take-up roll or is otherwise disposed of. After the release sheet has been removed from the flock, the substrate with the flock adhered thereto is cut to form the articles 11. It is also likely that one could remove the release liner either before or after the die cutting procedure. As shown in FIG. 3, a fringe material 50 can be applied to one pair but not the other pair of opposed peripheral edges of the flocked release sheet 1 during this manufacturing process.

Preferably the release sheet is flocked and supplied in roll form as shown in FIG. 5. However, the flocking of the release sheet could be made part of the process.

To produce flocked articles, such as shirts, jackets, sports bags, etc., which cannot be easily flocked on a continuous basis, the hot melt sheet can be applied to the transfer 1 prior to applying the transfer to the substrate. To do this, the thermoplastic hot melt film is placed in contact with the flock of the transfer, and the transfer and release sheet are heated to a temperature at which the thermoplastic hot melt film becomes tacky, but below the temperature at which the thermoplastic hot melt film begins to cure or physically adhere. This will adhere the thermoplastic hot melt film to the transfer 1 to form a transfer which can later be applied to an article by positioning the transfer with the hot melt film in position on the article (i.e., a piece of clothing) and applying heat and pressure to the transfer, for example, with an iron, sufficient to melt the hot melt film, to cause the hot melt film to somewhat cure or physically adhere, to adhere the flock, and secure to the clothing.

The method eliminates two steps from the prior art method: (1). Application of the binder adhesive, and (2) application, cleaning, sintering, and drying of the hot melt adhesive. In a continuous process, the present method also eliminates a station for applying the binder of hot melt adhesives as well as a station for drying the completed transfer. Because the station is not needed to apply (i.e., print) the binder and hot melt adhesives are applied to the flocking as part of the transfer, the machinery required to produce the article 11 is much less expensive (both in actual cost and in maintenance cost). Additionally, because the binder adhesive and hot melt adhesive is not used, the cost of the article of manufacture is reasonably reduced.

It is conceivable in the performance of the manufacture of the transfer of this invention, that the thermoplastic film may be a dual laminated type of film. For example, the upper surface may include a polyester type of film, that may have a melting point at a higher temperature. The lower film, laminated thereto, may be a polyethylene type of film, designed to have a lower temperature melting point. Hence, when the flock is applied to the upper surface of the laminated film, it will embed slightly into that film when heated, and the flock is electrostatically or otherwise applied, and while the bottom surface of the laminated film may likewise soften, once the transfer is cooled, all the films will become structurally sound, once again, in a film structure. Then, when a lower heat is applied to the transfer, for application of the transfer to a textile, rubber, or other surface, as when the transfer is being applied, the bottom polyethylene or EVA film will slightly soften, or melt, to function as an adhesive, for application of the entire transfer to its supporting substrate or surface. This is an example as to how the thermoplastic film(s) of this invention can be used not only for constructing of the transfer, but to function in a dual manner to allow for the application of the transfer to a shirt, bag, or other material, during its final application.

Another one of the advantages of utilization of thermoplastics, in the fabrication of flocked transfers, is that the binder adhesives previously used in the flocking process, typically contain an acrylic, or other materials, which may be flammable. Thermoplastics avoid that predicament. Furthermore, the thermoplastic type binder exhibits wash fastness, and will hold the flock in place even during severe washing conditions. Furthermore, thermoplastic films exhibit better elasticity, than can be obtained from the thermoset or other binder hot melt systems now in use. In addition, the use of the film provides a thinner profile for the finished product, providing a less bulky type of flock transfer, both visually and structural wise, when applied to a garment or other textiles. For example, flock transfers made in accordance with this invention can even be used upon sheer garment textiles. The usage of the thermoplastic film of this invention, avoids the necessity for application of binders, as previously used, and which contain formaldehyde or other undesirable chemicals, as used in previous adhesives to achieve cross linking for flocking purposes in the prior art. There are other miscellaneous film properties that are enhanced through the usage of thermoplastic films, versus the usage of the binder-hot melt powder combination, because there are films that have performance characteristics that cannot be obtained nor are they available for the binder-powder systems. For example, adhesions to leather, or other tough-to-stick-to-surfaces, that exhibit greater tensile strength, such as stretching that will not split, can be better accommodated through the usage of thermoplastic film.

Variations or modifications to the subject matter of this invention may occur to those skilled in the art upon reviewing the invention as described herein. Such variations, if within the scope of this invention, are intended to be encompassed within the claims to issue upon the invention of this application. The description of the preferred embodiment, as shown in the drawings, is set forth for illustrative purposes only.

I claim:

1. A flocked transfer comprising:
   a release sheet;
   a release agent on the release sheet;
   flock on the release agent; the flock being formed in a desired pattern on the release sheet, the release agent holding the flock to the release sheet;
   a pre-formed, solid, and self-supporting thermoplastic hot melt sheet;
   wherein at least substantially all of the flock contacts the thermoplastic hot melt sheet;
   and wherein there is no binder adhesive positioned between the thermoplastic hot melt sheet and the flock.

2. The flocked transfer of claim 1, wherein the thermoplastic hot melt sheet is a thermoplastic blank or thermoplastic blank film.

3. The flocked transfer of claim 1, wherein the release agent and release sheet are located on a first surface of the flock and the thermoplastic hot melt sheet is positioned on a second surface of the flock and the first and second surfaces are in an opposing relationship.

4. The flocked transfer of claim 1, wherein the thermoplastic hot melt sheet comprises polyurethane.

5. The flocked transfer of claim 1, wherein the hot melt sheet is cut, before application to the flocked transfer, to correspond to a shape of the flocked transfer.

6. The flocked transfer of claim 1, wherein the thermoplastic hot melt sheet comprises at least first and second parts, the first and second parts having differing properties.

7. The flocked transfer of claim 6, wherein the first and second parts have differing melting temperatures.

8. The flocked transfer of claim 6, wherein the first part contacts the flock and is located between the second part and the flock and wherein the first part has a higher melting temperature than the second part.

9. The flocked transfer of claim 6, wherein the first and second parts have differing viscosities when the first and second parts are melted.

10. The flocked transfer of claim 6, wherein the first part contacts the flock and is located between the second part and the flock and wherein, when the first and second parts are melted, the first part has a higher viscosity than the second part.

11. The flocked transfer of claim 6, wherein the first and second parts are in the form of films and the films are laminated together.

12. The flocked transfer of claim 1, wherein the transfer is adhered to a substrate, and wherein the thermoplastic hot melt sheet is preformed before application to the flock and substrate.

13. The flocked transfer of claim 1, wherein the transfer is adhered to a substrate, and wherein the substrate comprises rubber.

14. The flocked transfer of claim 1, wherein the adhesive component of the hot melt sheet consists essentially of a thermoplastic hot melt material.

15. The flocked transfer of claim 1, wherein the thermoplastic hot melt sheet has a substantially uniform thickness and substantially flat upper and lower surfaces.

16. The flocked transfer of claim 3, wherein substantially all of the thermoplastic hot melt sheet contacts the second surface of the flock.

17. The flocked transfer of claim 1, wherein the thermosplastic hot melt sheet has a substantially uniform thickness and substantially flat upper and lower surfaces.

18. The flocked transfer of claim 1, wherein the thermoplastic hot melt sheet is continuous.

19. A flocked transfer comprising:
a release sheet;
a release agent on the release sheet;
flock on the release agent; the flock having first ends and opposing second ends; the flock being formed in a desired pattern on the release sheet; the release agent being located between the flock and release sheet and holding the first ends of the flock to the release sheet, and
a pre-formed, solid, and self-supporting thermoplastic hot melt sheet engaging free ends of the flock, the flock being located between the release agent and the thermoplastic hot melt sheet, wherein at least most of the second ends of the flock are in direct physical contact with the thermoplastic hot melt sheet; and
wherein the thermoplastic hot melt sheet has a substantially uniform thickness and substantially flat upper and lower surfaces and wherein the flock fibers are substantially perpendicular to the upper and lower surfaces and to the release sheet.

20. The flocked transfer of claim 19, wherein the transfer is adhered to a substrate.

21. The flocked transfer of claim 19, wherein the thermoplastic hot melt sheet is a thermoplastic blank or thermoplastic blank film.

22. The flocked transfer of claim 19, wherein the flock comprises a plurality of flock fibers, wherein the release agent and release sheet are located on the first ends of the flock.

23. The flocked transfer of claim 19, wherein the thermoplastic hot melt sheet comprises polyurethane.

24. The flocked transfer of claim 19, wherein the hot melt sheet is cut, before application to the flocked transfer, to correspond to a shape of the flocked transfer.

25. The flocked transfer of claim 19, wherein the thermoplastic hot melt sheet comprises at least first and second parts, the first and second parts having differing properties.

26. The flocked transfer of claim 25, wherein the first and second parts have differing melting temperatures.

27. The flocked transfer of claim 26, wherein the first part contacts the flock and is located between the second part and the flock and wherein the first part has a higher melting temperature than the second part.

28. The flocked transfer of claim 25, wherein the first and second parts have differing viscosities when the first and second parts are melted.

29. The flocked transfer of claim 28, wherein the first part contacts the flock and is located between the second part and the flock and wherein, when the first and second parts are melted, the first part has a higher viscosity than the second part.

30. The flocked transfer of claim 25, wherein the first and second parts are laminated together.

31. The flocked transfer of claim 19, wherein there is no binder adhesive in contact with the thermoplastic hot melt sheet.

32. The flocked transfer of claim 19, wherein the flock comprises a plurality of flock fibers and at least most of the plurality of flock fibers are in direct contact with the hot melt sheet.

33. The flocked transfer of claim 20, wherein the substrate comprises rubber.

34. The flocked transfer of claim 19, wherein the adhesive component of the hot melt sheet consists essentially of a thermoplastic hot melt material.

35. The flocked transfer of claim 19, wherein substantially all of the thermoplastic sheet contacts the second ends of the flock.

36. The flocked transfer of claim 19, wherein the thermoplastic hot melt sheet is continuous.

37. A flocked article comprising:
a release sheet;
a release agent on the release sheet;
flock adhered to the release agent; the flock having first ends and opposing second ends;
the flock being formed in a desired pattern on the release sheet, the release agent holding the first ends of the flock to the release sheet;
a pre-formed, solid, and self-supporting thermoplastic hot melt sheet having a length and a width, and a first side engaging the second ends of the flock;
a substrate adhered to a second side of said thermoplastic hot melt sheet;
wherein at least substantially most of the second ends of the flock are adhered to the thermoplastic hot melt sheet;
and wherein there is no binder adhesive positioned between the flock and the substrate.

38. The flocked article of claim 37, wherein the thermoplastic hot melt sheet is continuous.

39. A flocked transfer assembly, comprising:
a release sheet;

a release agent on the release sheet;

flock fibers on the release agent; the flock fibers having opposing first and second ends, wherein the flock fibers are formed in a desired pattern on the release sheet, the release agent being located between the flock fibers and the release sheet and holding the first ends of the flock fibers to the release sheet; and a pre-formed, solid, continuous, and self-supporting thermoplastic adhesive sheet engaging the second ends of the flock fibers, the flock fibers being located between the release agent and the thermoplastic adhesive sheet, wherein the second ends of the flock fibers are in direct physical contact with and adhered to the thermoplastic adhesive sheet.

40. The flocked transfer assembly of claim 39, wherein the thermoplastic adhesive sheet comprises polyurethane.

41. The flocked transfer assembly of claim 39, wherein the thermoplastic adhesive sheet is not in contact with a powdered hot melt adhesive.

42. The flocked transfer assembly of claim 39, wherein there is no binder adhesive located between the thermoplastic adhesive sheet and the second ends of the flock fibers.

43. The flocked transfer assembly of claim 39, wherein the adhesive component of the thermoplastic adhesive sheet consists essentially of a thermoplastic polyester material.

44. The flocked transfer assembly of claim 39, wherein there is no binder adhesive between the second surface of the flock and the thermoplastic adhesive sheet.

45. The flocked transfer assembly of claim 39, wherein substantially none of the thermoplastic adhesive sheet fails to contact the second surface of the flock.

46. The flocked transfer assembly of claim 39, wherein said flocked transfer assembly does not include a substrate.

47. The flocked transfer assembly of claim 39, wherein the thermoplastic adhesive sheet has a substantially uniform thickness and substantially flat upper and lower surfaces and wherein at least most of the flock fibers are substantially perpendicular to planes of the upper and lower surfaces and the release sheet.

48. The flocked transfer assembly of claim 39, wherein the flock fibers are embedded in the thermoplastic adhesive sheet.

49. The flocked transfer assembly of claim 39, wherein at least most of the plurality of flock fibers are in direct physical contact with the thermoplastic adhesive sheet.

50. The flocked transfer assembly of claim 39, wherein there is no acrylic adhesive in direct physical contact with the second ends of the flock.

* * * * *